United States Patent [19]

Kinoshita et al.

[11] Patent Number: 5,251,309
[45] Date of Patent: Oct. 5, 1993

[54] SYSTEM FOR MEASURING THE EFFICIENCY OF ACCESSING VECTOR ELEMENTS USING INTERELEMENT DISTANCE OF VECTOR DATA OR BANK CONFLICTS

[75] Inventors: Kouji Kinoshita, Tokyo; Shigeyuki Ozawa; Shigenori Takekawa, both of Yamanashi, all of Japan

[73] Assignee: NEC Corporation, Tokyo, Japan

[21] Appl. No.: 431,188

[22] Filed: Nov. 3, 1989

[30] Foreign Application Priority Data

Nov. 7, 1988 [JP] Japan ................. 63-279410

[51] Int. Cl.$^5$ .................................. G06F 15/00
[52] U.S. Cl. ...................... 395/425; 395/800; 364/264; 364/264.4; 364/DIG. 1
[58] Field of Search ............ 395/425, 375, 800, 325, 395/650, 275, 200, 550; 364/200

[56] References Cited

U.S. PATENT DOCUMENTS

| | | | |
|---|---|---|---|
| 3,577,185 | 5/1971 | Belady | 395/425 |
| 3,588,837 | 6/1971 | Rash | 364/200 |
| 4,435,765 | 11/1981 | Uchida et al. | 395/550 |
| 4,745,545 | 5/1988 | Schiffleger | 364/200 |
| 4,777,592 | 10/1988 | Yano | 395/375 |
| 5,014,196 | 5/1991 | Hayashi et al. | 395/800 |

FOREIGN PATENT DOCUMENTS 60-57447  4/1985  Japan .

Primary Examiner—Robert B. Harrell
Assistant Examiner—Meng-Ai T. An
Attorney, Agent, or Firm—Foley & Lardner

[57] ABSTRACT

A data processing apparatus includes a register, an access time counter, a comparator, and a bank waiting time counter. The register calculates a minimum period of time required to access all elements which constitute vector data when the vector data is accessed. The access time counter counts the time which has lapsed after access for the vector data is started. The comparator compares a value calculated by the register with a value obtained by the access time counter. The bank waiting time counter is incremented in accordance with a comparison result obtained by the comparator. The bank waiting time counter thus stores the waiting time due to the bank conflict.

3 Claims, 8 Drawing Sheets

SYSTEM FOR MEASURING THE EFFICIENCY OF ACCESSING VECTOR ELEMENTS USING INTERELEMENT DISTANCE OF VECTOR DATA OR BANK CONFLICTS

BACKGROUND OF THE INVENTION

The present invention relates to a data processing apparatus and, more particularly, to a data processing apparatus which deals with vector data.

In a conventional data processing apparatus which deals with vector data, in order to perform a high-speed arithmetic operation, a large amount of data must be accessed at high speed to supply the accessed data to an arithmetic unit. Therefore, various techniques to realize a high throughput, e.g., a multibank technique have been freely used. However, for example, when elements of a two-dimensional data array are accessed in a column direction, all the elements often access a single bank depending on an array size, and the throughput may often be decreased noticeably.

In the above-mentioned conventional data processing apparatus, if the throughput of an entire system is decreased because of a throughput of memory access, in order to determine that a loss during the memory access causes performance degradation, a program must be analyzed to seek a location where the cause exists, i.e., whether the cause exists in the memory access, or in other operations. Program analysis must employ different viewpoints depending on the cases wherein causes exist in the memory access and in other operations. Therefore, if a cause is not apparent, a large number of operation steps must be undesirably required.

SUMMARY OF THE INVENTION

It is a principal object to provide a data processing apparatus which can count a delay time caused by a bank conflict between elements of vector data when the vector data is accessed.

According to one aspect of the present invention, there is provided a data processing apparatus for accessing vector data from a memory having a plurality of banks to perform a vector arithmetic operation, comprising:

calculating means for calculating a minimum period of time required to access all elements which constitute the vector data when the vector data is accessed;

first counting means for counting a time lapse after access for the vector data is started;

comparing means for comparing a value calculated by the calculating means with a value obtained by the first counting means; and second counting means incremented in accordance with a comparison result obtained by the comparing means.

According to another aspect of the present invention, there is provided a data processing apparatus for accessing vector data from a memory having a plurality of banks to perform a vector arithmetic operation, comprising:

calculating means for calculating a minimum period of time required to access all elements which constitute the vector data when the vector data is accessed;

counting means for counting a time lapse after access for the vector data is started;

subtracting means for calculating a difference between a value obtained by the counting means and a value calculated by the calculating means; and accumulating means for accumulating the difference obtained by the subtracting means in synchronism with an end of the access for the vector data.

DETAILED DESCRIPTION OF THE PREFERRED EMBODIMENTS

The present invention will be described hereinafter in detail with reference to the accompanying drawings.

Figure 1:
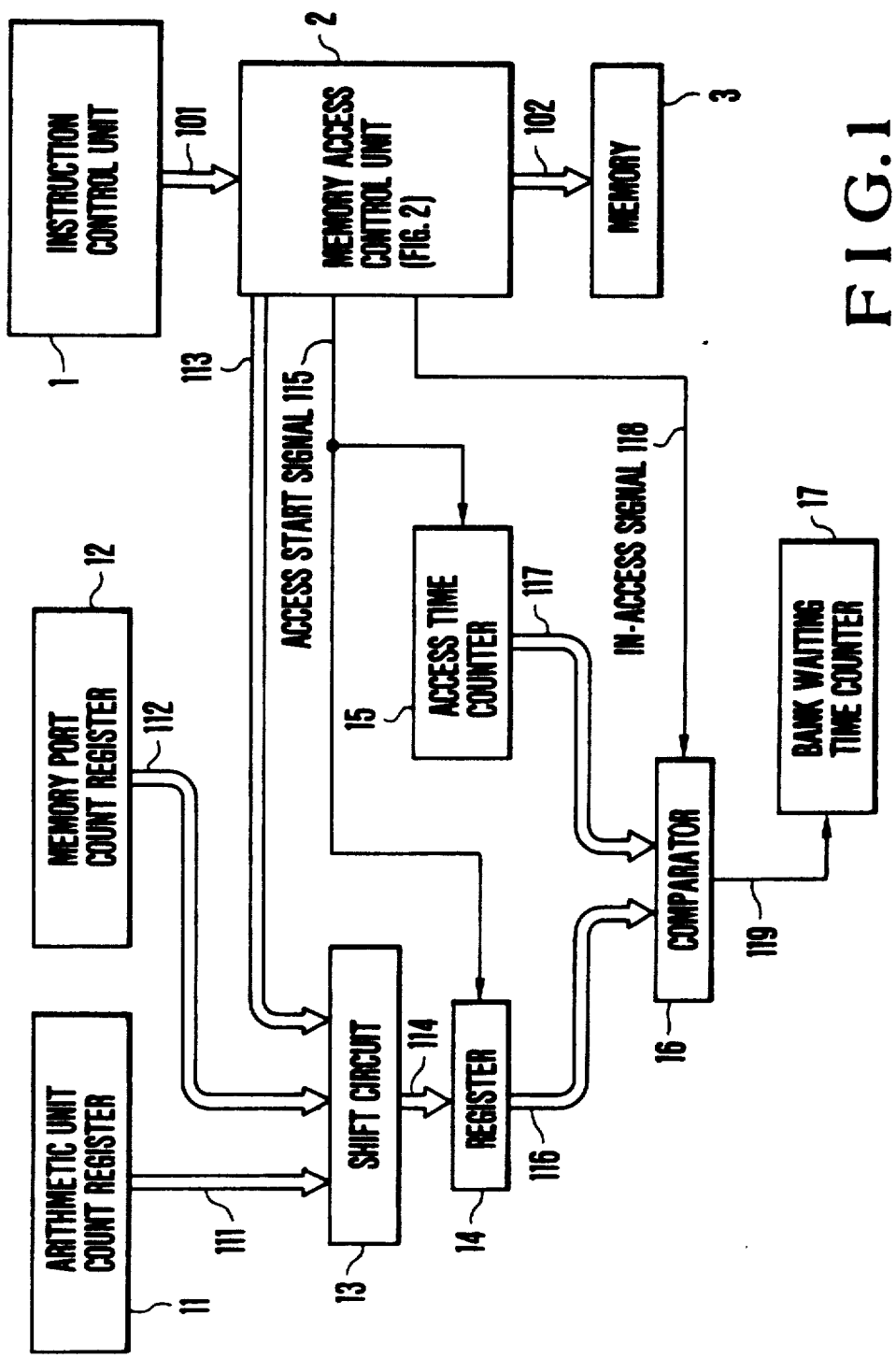
FIG. 1 is a block diagram showing an arrangement of a data processing apparatus according to a first embodiment of the present invention.

FIG. 1 shows an arrangement of a data processing apparatus according to a first embodiment of the present invention. The data processing apparatus includes an instruction control unit 1, a memory access control unit 2, a memory 3, an arithmetic unit count register 11, a memory port count register 12, a shift circuit 13, a register 14, an access time counter 15, a comparator 16, and a bank waiting time counter 17.

The instruction control unit 1 controls and executes instructions. This unit includes one or a plurality of sets of arithmetic operation pipelines defined by the arithmetic unit count register 11 (to be described later). In the plurality of arithmetic operation pipelines, the identical arithmetic operations are parallelly performed. When the instruction control unit 1 executes a memory reference instruction, a memory access request is output, and access data such as a request signal, a request address, an interelement distance of vector data in the memory, and the number of elements of the vector data are supplied to the memory access control unit 2 through a path 101.

The memory access control unit 2 controls access of the memory 3 in accordance with the access data supplied from the instruction control unit 1 through the path 101. The number of elements of the vector data is supplied to the shift circuit 13 through a path 113, an access start signal for the memory 3 is supplied to the register 14 and the access time counter 15 through a path 115, and an in-access signal for the memory 3 is supplied to the comparator 16 through a path 118.

The memory 3 consists of a plurality of banks and is connected to the memory access control unit 2 through a path 102 via a plurality of ports.

The arithmetic unit count register 11 holds the number of sets of the arithmetic operation pipelines in the instruction control unit 1. A value is set in the register 11 upon initialization of the system through a line (not shown). The held value is supplied to the shift circuit 13 through a path 111.

The memory port count register 12 holds the number of memory ports between the memory access control unit 2 and the memory 3. A value is set in the register 12 upon initialization of the system through a line (not shown). The held value is supplied to the shift circuit 13 through the path 112.

The shift circuit 13 receives the number of elements of the vector data from the memory access control unit 2 through the path 113. The supplied data is shifted to the right as a shift number on the basis of the number of simultaneously accessible elements determined in accordance with the number of sets of the arithmetic operation pipelines supplied through the path 111 and the number of memory ports supplied through the path 112. When the shifted bits include a "1" bit, the shift result is incremented by "1" to obtain a period of time required when there is no bank conflict between access operations of the elements in access for the vector data. The obtained period of time is supplied to the register 14 through a path 114.

The register 14 holds the period of time required when there is no bank conflict among the elements constituting the vector data during the access for the vector data which is supplied through the path 114. The register 14 is set at a timing when an access start signal supplied through a path 115 is set at "1". The contents of the register 14 are supplied to the comparator 16 through a path 116.

The access time counter 15 is reset to be "0" in response to the access start signal supplied through the path 115. Thereafter, the counter 15 is incremented by one for every cycle. The contents of the counter 15 are supplied to the comparator 16 through a path 117.

The comparator 16 compares the period of time required when there is no bank conflict, which time data is supplied through the path 116, with a period of time elapsed after the access is started, which time data is supplied through the path 117. During a period when the time period elapsed after the access is started is equal to or longer than the time period required when there is no bank conflict, and the in-access signal supplied through a path 118 is set at "1", a path 119 is set at "1", and the comparison result is output to the bank waiting time counter 17.

The bank waiting time counter 17 is incremented by one for every cycle in response to a signal representing that the period of time elapsed after the access is started, which time data is supplied through the path 119, exceeds the period of time required when there is no bank conflict. The bank waiting time counter 17 represents a waiting time due to the bank conflict.

Figure 2:
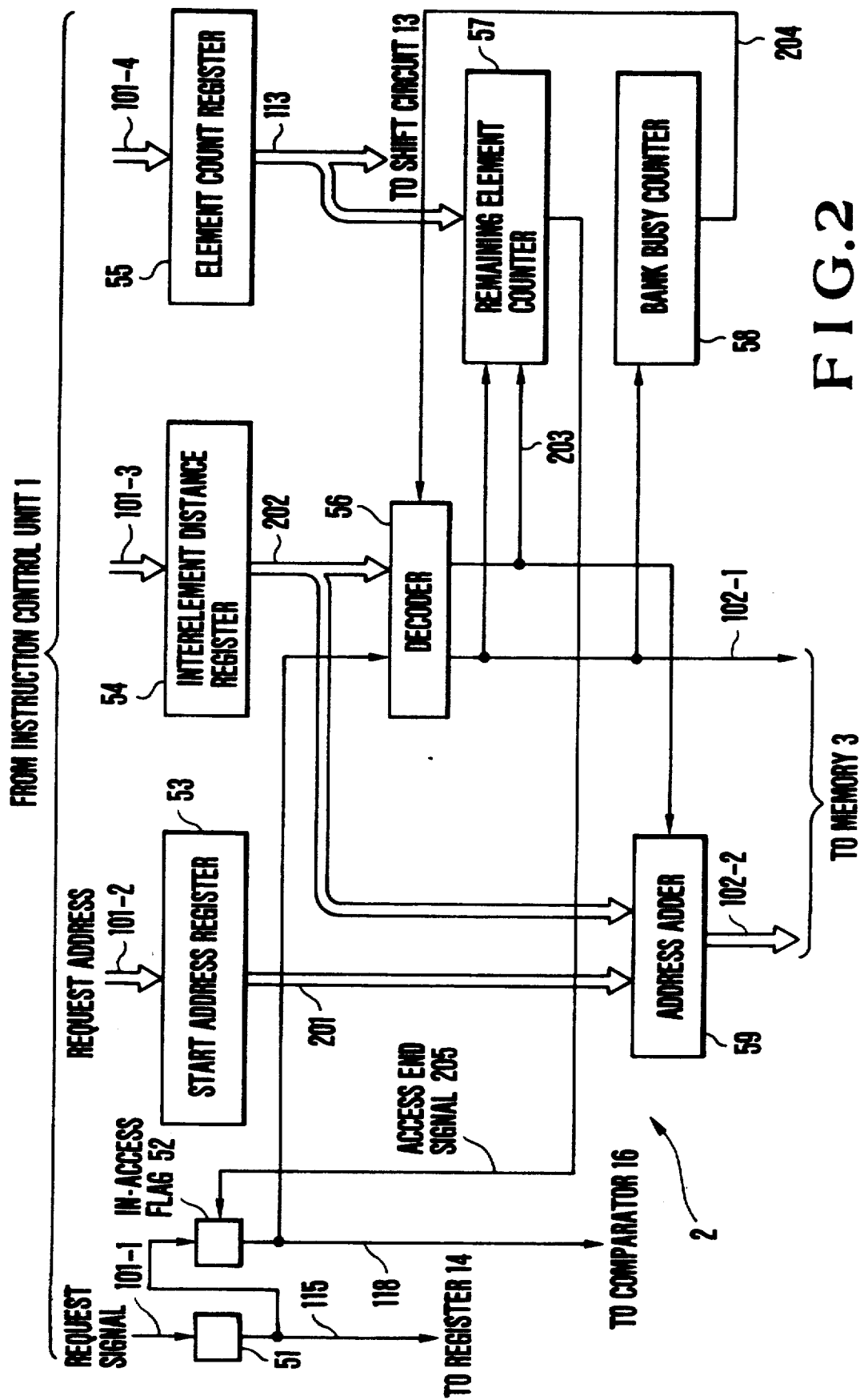
FIG. 2 is a block diagram showing a detailed arrangement of a memory access control unit shown in FIG. 1.

FIG. 2 shows a detailed arrangement of the memory access control unit 2 shown in FIG. 1.

A request signal, a request address, an interelement distance of the vector data, and the number of elements of the vector data are supplied from paths 101-1 to 101-4, and are set in registers 51, 53, 54, and 55, respectively. The register 51 holds the request signal during only one cycle, and instructs the start to access the vector data through the path 115. An in-access flag 52 is also set by the register 51. The in-access flag 52 holds "1" until it is reset in response to an access end signal supplied through a path 205. The contents of the flag 52 are supplied to a decoder 56 through the path 118, and are also supplied to the comparator 16 shown in FIG. 1. A control operation is performed through a line (not shown) so that a request signal is not supplied through the path 101-1 during a period when the in-access flag 52 is set at "1".

The request address represents an address of the first element of the vector data, and is supplied from the register 53 to an address adder 59 through a path 201. The address adder 59 adds interelement distances supplied through a path 202 to the request address to calculate an address of each element. The contents of the adder 59 are supplied to the memory 3 through the path 102-2. The address adder 59 is connected to the memory 3 through a plurality of ports. An address is generated in units of ports. The address of the first element accessed at the succeeding timing is generated by adding a value obtained by multiplying the interelement distance with the number of simultaneously accessible elements to the address of the first element at the preceding timing in accordance with the number of simultaneously accessible elements which is supplied through the path 203. Similarly, the addresses of the elements which constitute the vector data are generated until the address of the last element is generated, and the contents are supplied to the memory 3. The number of simultaneously accessible elements can be obtained by decoding the interelement distance by the decoder 56.

The decoder 56 decodes the interelement distance supplied through the path 202. In each cycle, the same number of elements are accessed in accordance with a relationship between the interelement distance and the number of banks in the memory. In this case, this relationship is derived from whether the interelement distance is relatively prime with the number of banks in the memory. The number of simultaneously accessible elements which do not cause an interelement bank conflict is calculated. At the same time, a time interval that the memory 3 can be accessed is calculated. The number of simultaneously accessible elements is supplied to a remaining element counter 57 and the address adder 59 through the path 203.

The decoder 56 generates a request timing with respect to the memory 3 using a time interval that the memory can be accessed, in the same manner as disclosed in, e.g., Japanese Patent Laid-Open No. 60-57447. The request timing is supplied to the memory 3, a bank busy counter 58, and the remaining element counter 57 through a path 102-1. The request timing is set at "1" during only a period when the in-access flag 52 is set at "1", and access for the memory 3 in practice can be started only when a value in the bank busy counter 58 is set to be "0".

The remaining element counter 57 monitors the number of remaining elements to be processed. The counter 57 receives the number of elements through the path 113. The number of access operations for the memory 3 is obtained in accordance with the number of simultaneously accessible elements supplied through the path 203, and the obtained number is set in the counter 57 as an initial value. The value is decremented by 1 at each request timing supplied to the memory 3 through the path 102-1 every request. When the counter 57 detects that the value is set to be "0", i.e., that the counter is set at "1" and the path 102-1 is set at "1", the access end signal on a path 205 is set at "1", and the in-access flag 52 is reset.

A bank cycle time is set in the bank busy counter 58 as an initial value every request supplied to the memory 3. The value is decremented by one for every cycle. When the value is set to be "0", all the banks are not busy, and a 1-bit output from the counter 58 is supplied to the decoder 56.

With the above arrangement, an operation in the first embodiment will be described below with reference to timing charts. In addition, assume that, in this embodiment, the number of memory ports is 2, the number of sets of the arithmetic operation pipelines is 2, the number of banks in the memory is 16 (8 for each port), and a bank cycle time is given as 8 cycles. Assume that each bank has an 8-byte width. In other words, a maximum of two elements can be simultaneously accessed.

Figure 3:
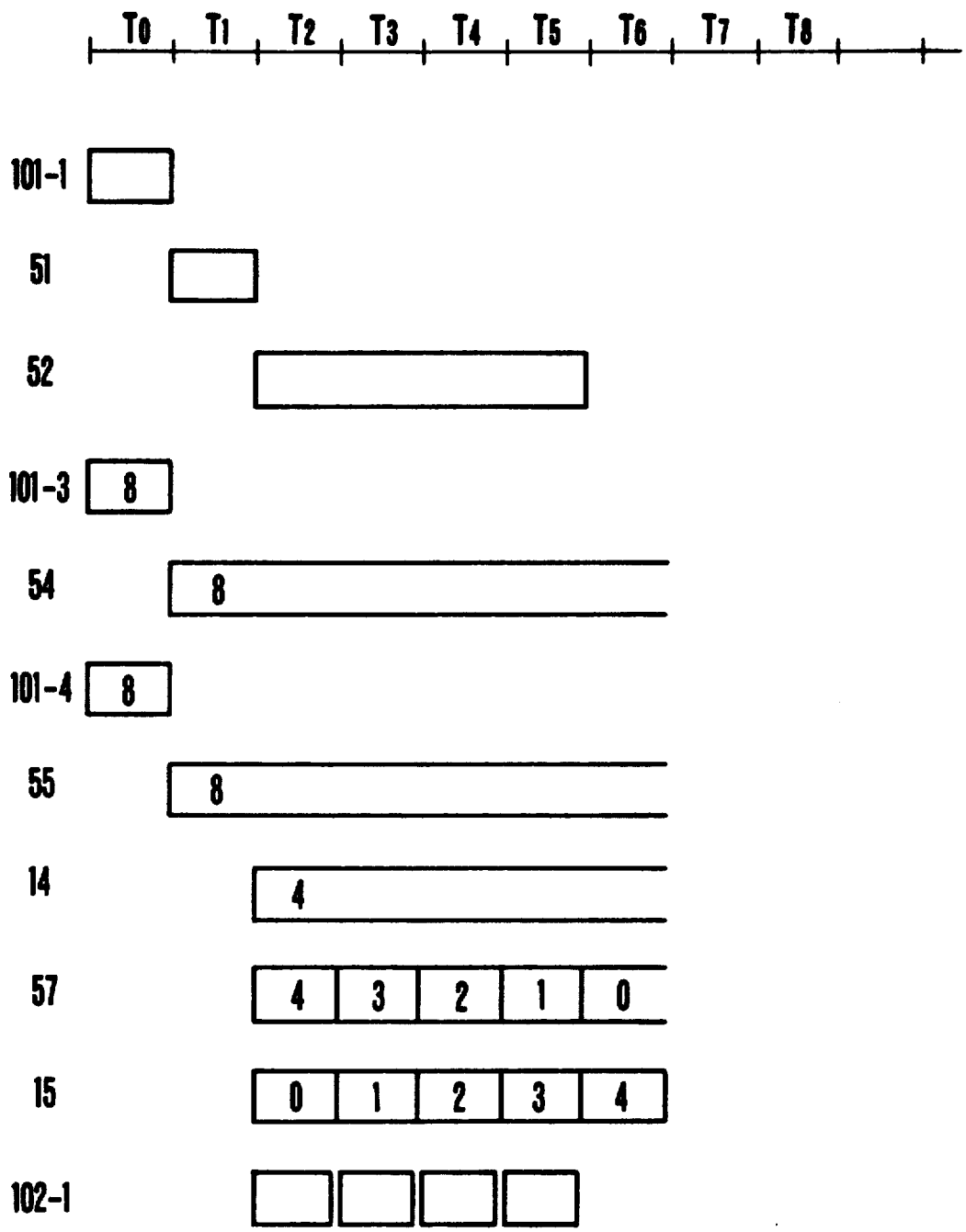
FIGS. 3 and 4 are timing charts for explaining an operation in the first embodiment.

FIG. 3 shows an operation when vector data having an 8-byte interelement distance is accessed. The number of elements is 8. When a request signal is supplied from the instruction control unit 1 to the memory access control unit 2 through the path 101-1 during a time interval $T_0$, the register 51 is set at "1", and a start address, an interelement distance, and the number of elements are set in the resisters 53, 54, and 55, respectively.

Since the register 51 is set at "1" during a time interval $T_1$, the in-access flag 52 is set by the path 115. In addition, a period of time required when there is no bank conflict is set in the register 14. Since the maximum number of simultaneously accessible elements is 2, at this time, a value "4" obtained by dividing the number of elements "8" by 2 is set in the register 14. In addition, the access time counter 15 is cleared.

Thereafter, the access time counter 15 is incremented by 1 during time intervals $T_2$, $T_3$, $T_4$, . . . , and the value set in the counter 15 is the same as the value "4" in the register 14 during the time interval $T_6$. However, since the access for the memory is completed during four cycles, i.e., the time intervals $T_2$, $T_3$, $T_4$, and $T_5$, the in-access flag 52 is reset to be "0" during the time interval $T_6$, and an output from the comparator 16 is invalid. Therefore, when the vector data having the 8-byte interelement distance is accessed, the bank waiting time counter 17 is never incremented.

Figure 4:
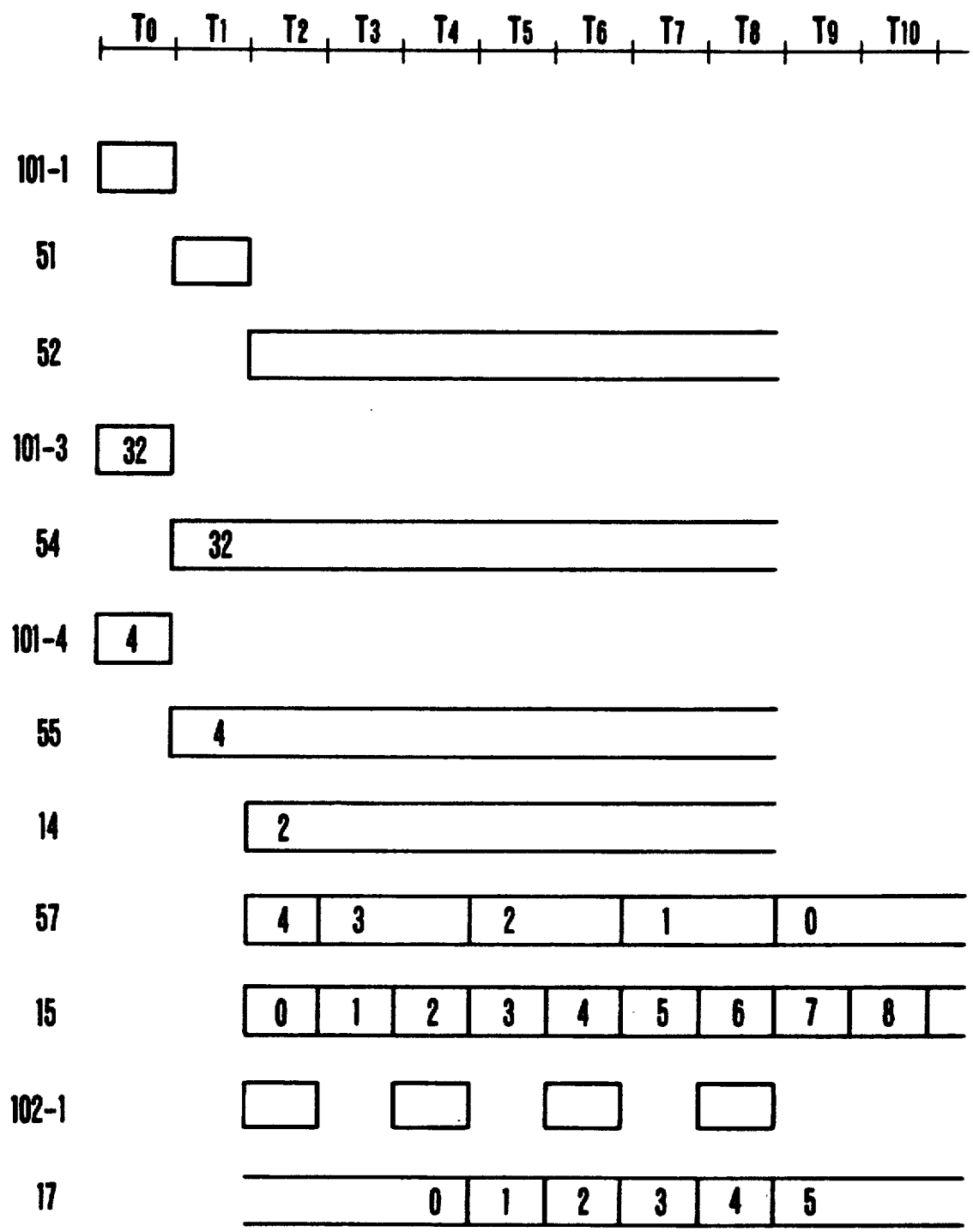

FIG. 4 shows an operation when vector data having a 32-byte interelement distance and four elements is accessed. In the same manner as in FIG. 3, a request signal is supplied from the instruction control unit 1 through the path 101-1 during a time interval $T_0$, and a start address, an interelement distance, and the number of elements are set in the registers 53, 54, and 55, respectively.

The in-access flag 52 is set during a time interval $T_1$, and a value "2" obtained by dividing the number of elements "4" by the maximum number of simultaneously accessible elements is set in the register 14. In addition, the access time counter 15 is reset to be "0" during the time interval $T_1$.

The access time counter 15 is incremented by one for every cycle from a time interval $T_2$, and is incremented from "1" to "2" during a time interval $T_3$. Thereafter, a value larger than "2" is set in the counter 15 until access for the next vector data is started. If the interelement distance is given as 32 bytes, only one element can be accessed during two cycles under the given conditions of the number of banks and the bank cycle time. In practice, the access is performed every four banks, so that the access is returned to the first bank after four elements are accessed. Therefore, when each element is accessed every two cycles, any bank conflict does not occur between the elements because the bank cycle time is given as 8 cycles.

For this reason, the remaining element counter 57 is decremented by one in response to the first request on the path 102-1 to the memory during the time interval $T_2$. Thereafter, the counter 57 is decremented by one every two cycles. When the last request to the memory is supplied during a time interval $T_8$, the counter 57 is set to be "0". Therefore, the in-access flag 52 is set at "1" during a cycle from the time interval $T_2$ to the time interval $T_8$. In addition, a period in which a value set in the access time counter 17 is equal to or larger than a value "2" held in the register 14 during the cycle from the time interval $T_2$ to the time interval $T_8$, i.e., a 5-cycle period from the time interval $T_4$ to the time interval $T_8$, the bank waiting time counter 17 is incremented. From a time interval $T_9$, the value at the counter 17 is incremented by "5".

In practice, 7 cycles are required for access due to a bank conflict although only 2 cycles are required if there is no bank conflict. A time period required for, e.g., the banks is given as 5 cycles, and this value is accumulated in the bank waiting time counter 17.

Figure 5:
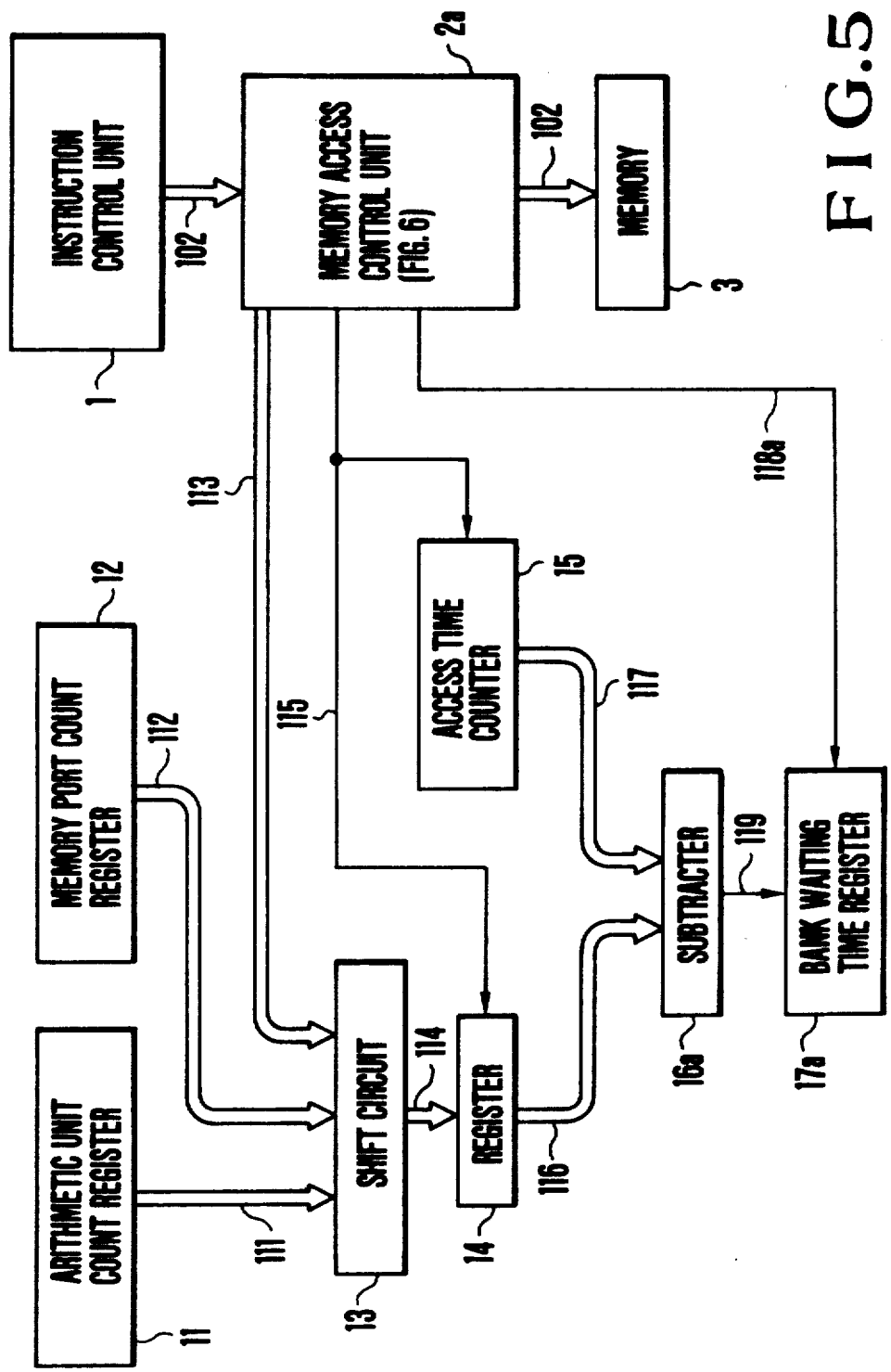
FIG. 5 is a block diagram showing an arrangement of a data processing apparatus according to a second embodiment of the present invention.

FIG. 5 shows an arrangement of a data processing apparatus according to a second embodiment of the present invention. This apparatus includes an instruction control unit 1, a memory access control unit 2a, a memory 3, an arithmetic unit count register 11, a memory port count register 12, a shift circuit 13, a register 14, an access time counter 15, a subtracter 16a, and a bank waiting time register 17a. Only differences between the first and second embodiments will be described hereinafter.

The memory access control unit 2a supplies an access end signal for the memory 3 to the bank waiting time register 17a through a path 118a.

The contents of the register 14 are supplied to the subtracter 16a through a path 116. The contents of the access time counter 15 are supplied to the subtracter 16a through a path 117. The subtracter 16a subtracts a time period required when there is no bank conflict, which time data is supplied through the path 116, from a time lapse after access is started, which time data is supplied through the path 117, and this difference is supplied to the bank waiting time register 17a through a path 119. The bank waiting time register 17a adds the difference between the time lapse after the access is started, which time data is supplied through the path 119, and a time period required when there is no bank conflict to a value held by the register 17a. In addition, the register 17a is set at an access end timing supplied through the path 118a to accumulate a time period delayed due to a bank conflict.

Figure 6:
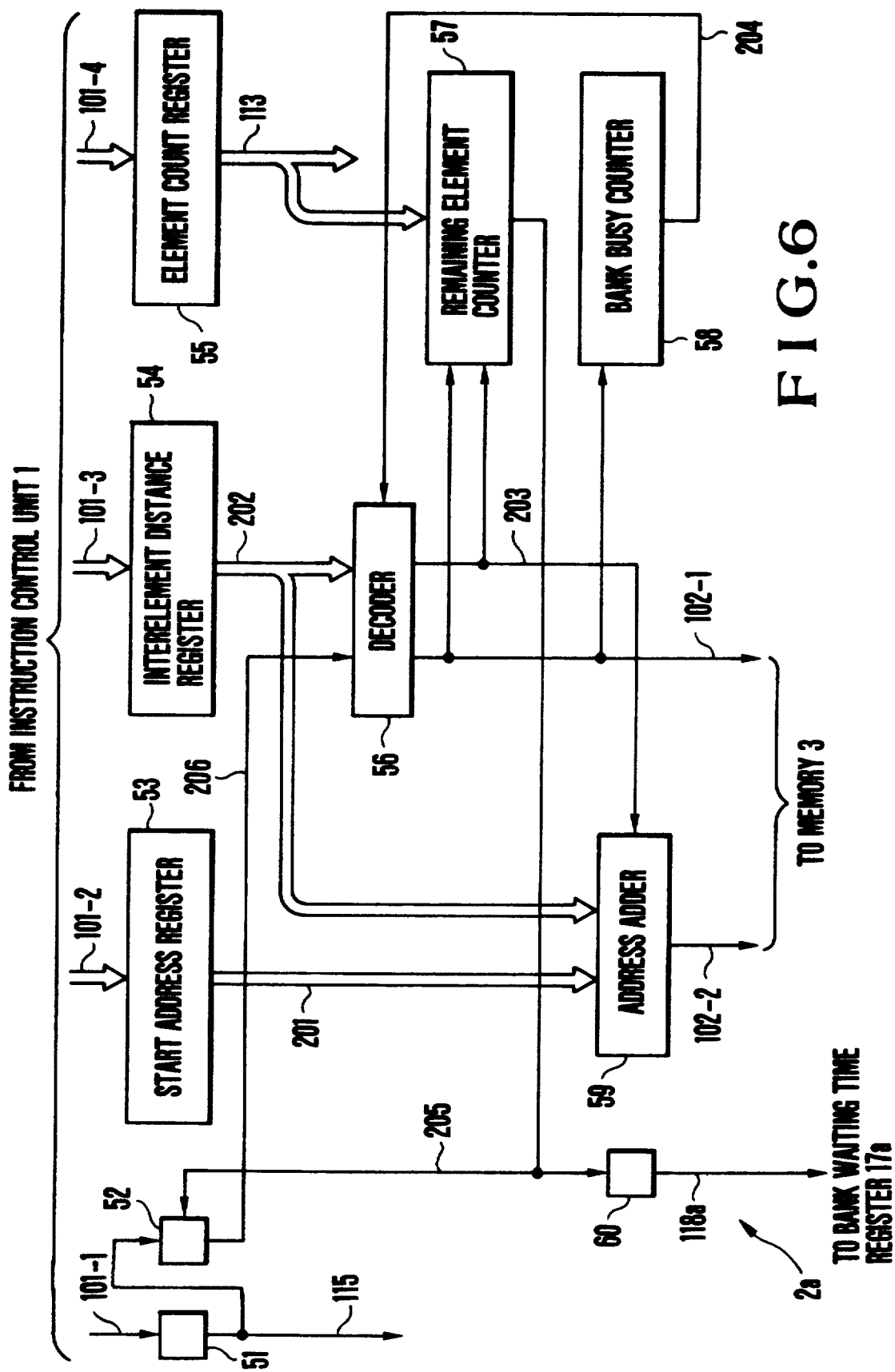
FIG. 6 is a block diagram showing a detailed arrangement of a memory access control unit shown in FIG. 5.

FIG. 6 shows a detailed arrangement of the memory access control unit 2a shown in FIG. 5. Only differences in memory access control unit between the first and second embodiments will be described hereinafter.

An in-access flag 52 holds "1" until it is reset in response to an access end signal supplied through a path 205. The contents of the flag 52 are supplied to a decoder through a path 206.

When the remaining element counter 57 detects that its value is set to be "0", an access end flag 60 is set. The access end flag 60 is a flip-flop for holding the access end signal from the path 205 during one cycle. The contents of the flag 60 are supplied to the bank waiting time register 17a through the path 118a.

With the above arrangement, an operation in the second embodiment will be described hereinafter with reference to the timing charts. Assume that, in this embodiment, the number of memory ports is 2, the number of sets of arithmetic operation pipelines is 2, the number of banks in the memory is 16 (8 for each port), and a bank cycle time is given as 8 cycles, as in the first embodiment. In addition, assume that each bank has an 8-byte width. In other words, a maximum of two elements can be simultaneously accessed.

Figure 7:
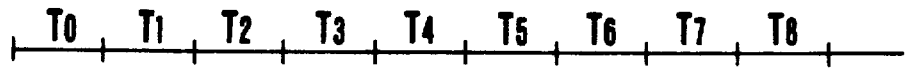
FIGS. 7 and 8 are timing charts for explaining an operation in the second embodiment.

FIG. 7 shows an operation when vector data having an 8-byte interelement distance is accessed. The number of elements is 8. When a request signal is supplied from the instruction control unit 1 to the memory access control unit 2a through a path 101-1 during a time interval $T_0$, a register 51 is set at "1", and a start address, an interelement distance, and the number of elements are set in the registers 53, 54, and 55, respectively.

Since the register 51 is set at "1" during a time interval $T_1$, the in-access flag 52 is set by a path 115. In addition, a time period required when there is no bank conflict is set in the register 14. Since the maximum number of simultaneously accessible elements is 2, at this time, a value "4" obtained by dividing the number of elements "8" by 2 is set in the register 14. In addition, the access time counter 15 is cleared.

When the interelement distance is given as 8 bytes, a request signal is supplied to the memory 3 through a path 102-1 every cycle. Therefore, the last request is supplied during a time interval $T_5$. Since the remaining element counter 57 is set to be "1" at this timing, the access end signal on the path 205 is set at "1", and the access end flag 60 is set at "1". Therefore, a difference between the value set in the access time counter 15 and that in the register 14 during a time interval $T_6$ which is the succeeding cycle is supplied to the bank waiting time register 17a. The value set in the access time counter 15 is only "4" although it is incremented by "1" for every cycle from a time interval $T_2$. A difference in value between the counter 15 and the register 14 is "0", and the value set in the bank waiting time register 17a is not changed.

Figure 8:
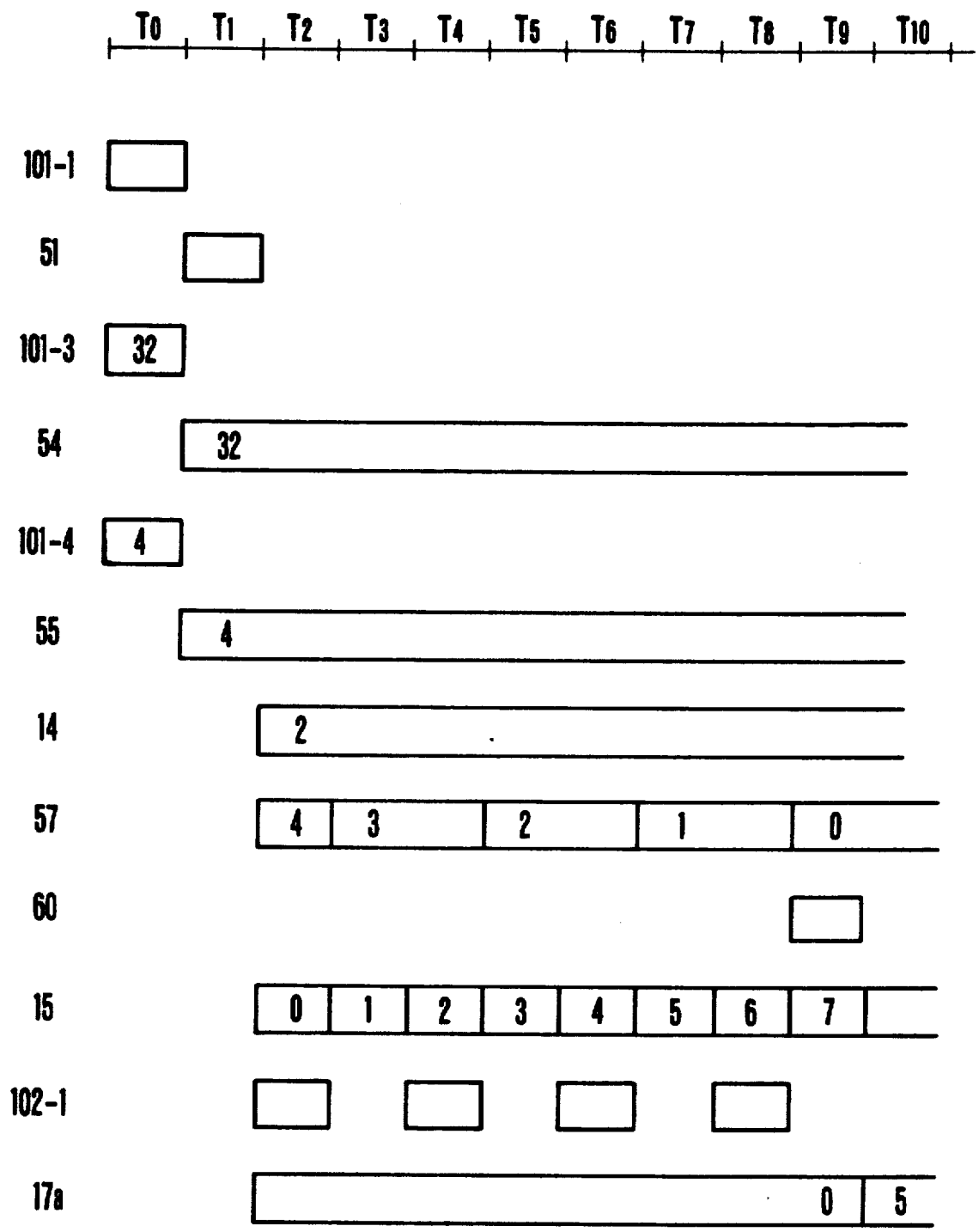

FIG. 8 shows an operation when vector data having a 32-byte interelement distance and four elements is accessed. In the same manner as in FIG. 7, a request signal is supplied from the instruction control unit 1 through the path 101-1 during a time interval $T_0$, and a start address, an interelement distance, and the number of elements are set in the registers 53, 54, and 55, respectively.

The in-access flag 52 is set during a time interval $T_1$, and a value "2" obtained by dividing the number of elements "4" by the maximum number of simultaneously accessible elements, i.e., "2", is set in the register 14. In addition, the access time counter 15 is reset to be "0" during the time interval $T_1$.

If the interelement distance is given as 32 bytes, only one element can be accessed during two cycles under the given conditions of the number of banks and the bank cycle time. In practice, the access is performed every four banks, so that the access is returned to the first bank after four elements are accessed. Therefore, when each element is accessed every two cycles, any bank conflict does not occur between the elements because the bank cycle time is given as 8 cycles.

For this reason, after a value "4" which is the number of elements is set in the remaining element counter 57 during the time interval $T_1$, the counter 57 is decremented by one for every output of a request signal supplied to the memory 3 through the path 102-1. The value in the counter 57 is set to be "1" during a time interval $T_8$. The last request signal is supplied to the memory 3, and the access end flag 60 is set. On the other hand, the access time counter 15 is incremented by one for every cycle from time $T_2$, and the value in the counter 15 is set to be "7" during a time interval $T_9$. Therefore, a difference "5" between a value "7" in the access time counter 15 and a value "2" held by the register 14 is supplied to the bank waiting time register 17a during the time interval $T_9$.

In practice, 7 cycles are required for access due to a bank conflict although only 2 cycles are required if there is no bank conflict, and a time period required to wait for the bank access, i.e., 5 cycles, is accumulated in the bank waiting time register 17a.

As has been described above, according to the present invention, when vector data is accessed, the time period required when there is no bank conflict between the elements is compared with a time lapse after the access is started in practice. When the time lapse is equal to the time period, or a counter incremented by a difference between the two periods is arranged, or a means is arranged for subtracting the time period required when there is no bank conflict between the elements in the vector data from the time lapse required from the access start to the access end in practice, a time delay due to the bank conflict between elements in the vector data upon access for the vector data can be counted.

What is claimed is:

1. A data processing apparatus for accessing vector data from a memory having a plurality of banks to perform a vector arithmetic operation by determining, dependent on an interelement distance of the vector data, both a number of elements to be accessed simultaneously and a time interval for each element to be accessed, comprising:

calculating means for calculating a minimum period of time required to access all elements which constitute the vector data when the vector data is accessed and outputting a calculated value which is dependent upon an access time required when there is no bank conflict, said bank conflict being dependent upon said interelement distance;

first counting means for counting a period of time elapsed after access for the vector data is started and outputting a counted value;

a comparator receiving said calculated value and said counted value and outputting a comparison result; and second counting means, receiving said comparison result, for incrementing a bank waiting time in accordance with said comparison result.

2. A data processor apparatus as recited in claim 1, wherein said second counting means is incremented when said comparison result indicates that said counted value exceeds said calculated value.

3. A data processing apparatus for accessing vector data from a memory having a plurality of banks to perform a vector arithmetic operation, by determining, dependent on an interelement distance of the vector data, both a number of elements to be accessed simultaneously and a time interval for each element to be accessed, comprising:

calculating means for calculating a minimum period of time required to access all elements which constitute the vector data when the vector data is accessed and outputting a calculated value which is dependent upon an access time required when there is no bank conflict, said bank conflict being dependent upon said interelement distance;

counting means for counting a period of time elapsed after access for the vector data is started and outputting a counted value;

a subtracter, receiving said counted value and said calculated value, and outputting a difference between said counted value and said calculated value; and accumulating means, receiving said difference, for adding said difference to a value stored in said accumulating means in synchronism with an end of the access for the vector data.

* * * * *